Feb. 2, 1971   E. BERGERE   3,560,124
RIVET FASTENER
Filed Nov. 1, 1966

EMRIC BERGERE. INVENTOR.

BY Emric W. Bergere.

3,560,124
RIVET FASTENER
Emric Bergere, 2324 Nottingham Ave.,
Los Angeles, Calif. 90027
Filed Nov. 1, 1966, Ser. No. 595,562
Int. Cl. F16b 19/05
U.S. Cl. 85—7                                                                 7 Claims

ABSTRACT OF THE DISCLOSURE

A fastener for joining structural members is disclosed which markedly improve the fatigue life of the structural members. The fastener includes a pin having a head and a shank adapted to be inserted through aligned apertures in the structural members. The shank includes a tapered portion, a collar-receiving portion at the end opposite the head and an intermediate portion connecting the tapered portion and the collar-receiving portion. The tapered portion of the shank is adapted to seat, with an interference fit, in tapered parts of the apertures so that when the pin is set in place under tension, the parts of the structural members surrounding the tapered portion of the pin are subjected to compressive preloads higher than the tensile loads to be applied to the structural members during utilization. The collar has planar ends, frusto-conical end sections and a sinuous exterior surface between the end sections. The collar is swaged about and within an annular depression in the collar-receiving portion of the pin by means of a setting tool cooperating with one of the frusto-conical end sections thereby seating the pin and subjecting it to substantial tensile load. The desired compressive bearing preload is thereby produced in the parts of the structural members surrounding the tapered portion of the pin.

---

This invention relates to means for attaching structural elements to plates or panels, and more specifically to a double tapered pin having a preformed head adapted to be inserted from one side of the work having a tapered hole to accept the pin in an interference fit, and a collar, on the opposite side of the work, which is to be locked to the pin. An object of the invention is to provide an improved method of fastening a plurality of plates which are first pressed tightly together and the pin pressed or driven in place, the collar then swaged into a groove on the end of the pin by means of a tool designed for this purpose so that a tight joint is effected.

A further object of the invention is to fill the hole in the structural assembly and produce a compressive load in the hole bearing area which is greater than the tensile stresses in structure and by this means, improve the fatigue life of aircraft and similar skin and structure assemblies. Also, the skin, which is the thinner portion of the joint, from 1/3 to 1/5 of the total thickness, receives a lower compressive force and is subject to earlier fatigue failure from tensile cracks radiating from the hole circumference and by this invention, wherein the interference fit from the pin, is increased by the secondary and larger taper under the head, an improved fatigue life is obtained in the skin.

Another object of the invention is to provide a collar having a contour so proportioned that it fills the groove in the pin without trimming any excess as outlined in Wing Pat. No. 2,355,579. By the swaging of this new collar, high pre-load and tensile strength is obtained by the elimination of the relaxation of joint tightness produced by the trimming operation of the old type, cylindrical collar.

Other objects and the advantages of the invention will be apparent in the following description taken in conjunction with the accompanying drawings, wherein.

Figure 1:
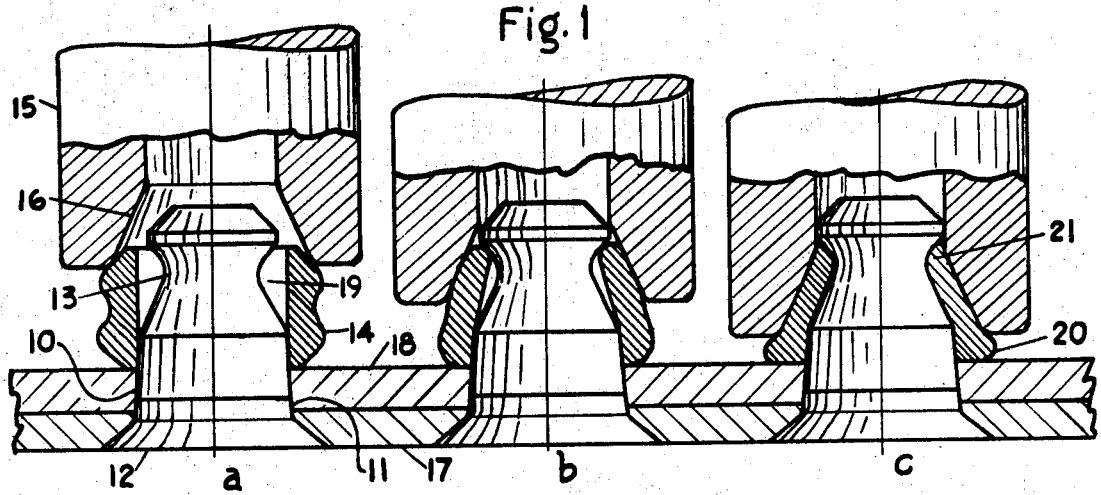
FIG. 1 is a vertical section showing a thinner skin and the structure, secured together by this invention in the minimum grip condition and showing by stages the manner in which the joint with a flush head fastener is assembled.

Referring to the drawings by reference characters, I have shown my invention as applied to like parts throughout and where in FIG. 1, the fully hardened metal pin is shown in various stages of installation: FIG. 1a, the initial position with the pin driven, by a riveting gun, into a tapered hole providing an interference fit not exceeding the elastic limit of the sheet structure in compressive stresses produced on the hole bearing area and while the main portion of the pin shank contains a taper 10 of about 1/4 inch per foot—the standard for taper pins in American Machinist Handbook—the head 12 has an adjacent shank portion 11 about twice the taper of 1/2 inch per foot to provide the thin skin with a higher compressive load in proportion to the heavier sub-structure, thus relieving the skin from fatigue failures. Collar 14 contains a volume equal to that required, when tool 15 imposes the hollow slope 16 with an included angle of forty-five to fifty-five degrees, either by steady pressure or riveting impact, to contact groove 13 and fill cavity 19. The pin head in skin 17 locks the pin in tension when collar 14 contacts plate 18 as illustrated in FIG. 1b when the tool has compressed collar 14 to a mid-point and in FIG. 1c when the tool has closed the collar under the pin groove in a shear ring volume 21 and forced a bearing area 20 against the structure with a high tensile preload, which is equal to the stress obtained by torquing a threaded bolt and nut of equivalent material strength but with the assurance of safety that the collar will not spin off due to vibration. Another feature of this invention is the elimination of shearing the collar to obtain pin groove fill which requires that the material be relatively softer than the pin as in presently used aircraft combinations where the pin material is of 160,000 p.s.i tensile strength and the collar of aluminum alloy of 61,000 p.s.i. tensile strength and the collar of aluminum alloy of 16,000 p.s.i. tensile strength. The collar in this tested invention was of 140,000 p.s.i. material and failed in tension at twice the load obtained on the similar pin with an aluminum alloy collar, National Aircraft Standard Part Number 528.

Figure 2:
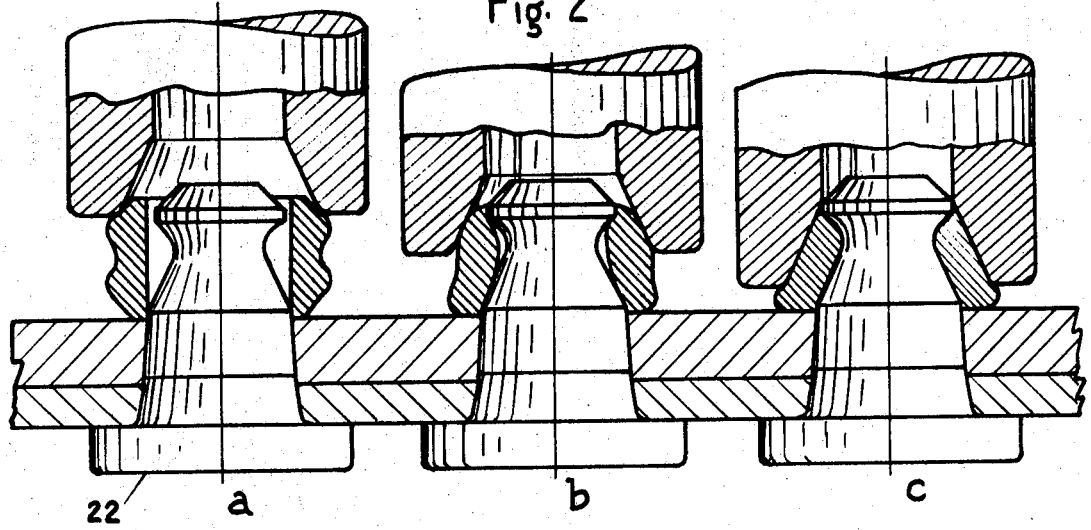
FIG. 2 is similar to FIG. 1, in the maximum grip condition and with a protruding head fastener.

FIG. 2a, b, c is similar to the description of FIG. 1, except that the joint is in maximum instead of minimum grip and that the pin head 22 is the protruding type. Comparing the groove and collar relatioinships in the phases of tool setting of the locking action, taken from cross sections of actual installations, it is a proof of invention that the collar volume is retained and not sheared of excess material.

Figure 3:
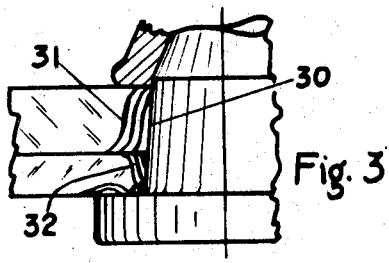
FIG. 3 is a representation of a polarized-light view of the stresses made by a continuous taper shank fastener.

FIG. 3 illustrates the visual stress study made on an uniformly tapered shank pin 30 installed in plastic structure with interference fit. By viewing the contact area with polarized light, compressive fringe lines of stress distribution 31 in the structure and 32 in the skin is delineated. The greater the number of fringe lines, the higher the force and the shank portion in the skin at the head is of a low magnitude.

Figure 4:
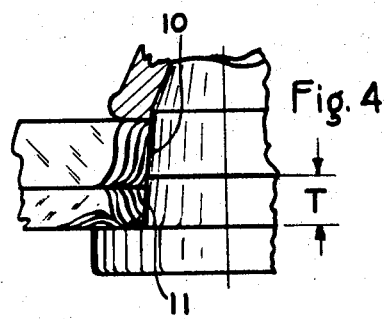
FIG. 4 is similar to FIG. 3 but with a stepped taper shank fastener.

FIG. 4 shows in a similar manner to FIG. 3 that when the shank taper 10 is doubled under the head 11 to a proportion T of .4 to .8 of the various sized shank diameters, the load stress fringes are almost doubled and meet the outline of the structure lines at the joint plane.

Figure 5:
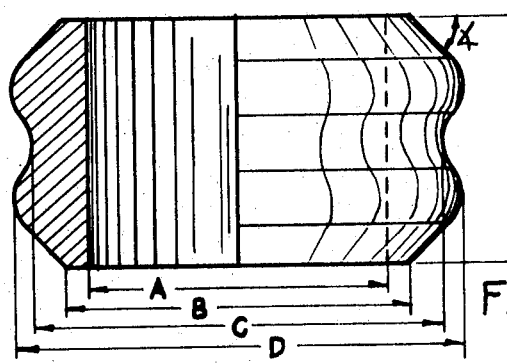
FIG. 5 is a side elevation, partly in cross section of the collar according to this invention.

FIG. 5 illustrates the lettered dimensions which are proportioned to obtain the volume required to fill the groove in each required size or pin and grip variation. Angle ⊀ was found by testing to be 40° to 50° for providing the required contact with the setting tool.

An important result found by this invention is in the use of titanium alloy high strength pins with collars of the same material, required for supersonic aircraft construction, wherein high shear, bearing, pre-load and tension strengths are obtained which could only be matched with expensive bolts and self-locking nuts at a weight penalty. In areas requiring elevated temperature resistant steels as in jet engines, collar strengths can match the pins and here the aluminum collar cannot be used as it is limited to 250° F. operation while A–286 alloy collars, as an example, can operate at 1200° F.

This invention is not to be limited by the embodiments shown in the drawings and described in the specifications which are given by way of example and not of limitation, but only in accordance with the scope of the following.

I claim:

1. A rivet fastener for joining a plurality of structural members comprising:
   a pin including a head with a shank extending therefrom, said shank having a collar-receiving portion including an annular depression at the end of said shank opposite said head, a tapered portion adjacent said head tapering toward said collar-receiving portion, and an intermediate tapered portion connecting said tapered and collar-receiving portions, said tapered portion having a slope steeper than said intermediate portion to place at least parts of said structural members about said pin under substantial compressive load when said rivet fastener is set under tension; and
   a collar adapted to be engaged by a setting tool means and swaged by said tool means onto said collar-receiving end whereby said collar substantially entirely fills said annular depression and bears against an adjacent structural member and subjects said pin to high tensile preload and said parts of said structural members about the tapered portion of said pin to high compressive preloads.

2. A rivet fastener, as defined in claim 1, in which:
   said tapered portion of said pin has a taper of about one-half inch per foot and said intermediate portion is provided with a taper of about one-quarter inch per foot; and
   said collar includes planar ends disposed perpendicular to a central axis of symmetry, end sections having frusto-conical exterior surfaces concentric of said axis and tapering toward the planar ends and a center section interconnecting said end sections, said center section being concentric of said axis and having a smoothly curved, sinuous exterior surface defining a pair of axially spaced annular ridges.

3. A rivet fastener, as defined in claim 1, in which:
   said pin and said collar are of similar material and hardness.

4. A rivet fastener pin adapted to be received by structural means in an interference fit to subject said structural means to a compressive load about said pin, comprising:
   a head; and
   a shank having a tapered portion extending from said head, a collar-receiving portion and an intermediate tapered portion coupling said tapered and collar-receiving portions, said tapered portion having a greater slope than said intermediate portion.

5. A rivet fastener pin, as defined in claim 4, in which:
   said tapered portion has a taper of about one-half inch per foot and said intermediate portion is provided with a taper of about one-quarter inch per foot.

6. A rivet fastener collar of a metal having a hardness and a toughness such as that of a titanium alloy, said collar having a generally cylindrical configuration about a central axis of symmetry, said collar adapted to be swaged onto a rivet pin having an annular groove about the collar receiving end adapted to project from the structural means to be joined, said collar comprising:
   planar ends disposed perpendicular to said axis;
   end sections having frusto-conical exterior surfaces concentric of said axis and tapering toward the planar ends; and
   a center section interconnecting said end sections and disposed concentric of said axis and having a smoothly curved, sinuous exterior surface defining a pair of axially spaced annular ridges whereby, during swaging, the collar material flows smoothly due to said smoothly curved surface to completely fill the pin groove without cracking or splitting of the collar to place the pin under high tensile load and the end of the collar engaging the structural means expands to form an enlarged bearing area.

7. A rivet fastener collar, as defined in claim 6, in which:
   the frusto-conical exterior surfaces of said end sections define angles of between about 40°–50° with the planes of the respective collar ends.

References Cited

UNITED STATES PATENTS

| | | | |
|---|---|---|---|
| 2,001,145 | 5/1935 | Lambert | 29—510 |
| 2,355,579 | 8/1944 | Wing | 29—517 |
| 2,397,076 | 3/1946 | Keller | 29—510 |
| 2,542,376 | 2/1951 | Torresen | 29—505 |
| 2,955,505 | 10/1960 | Schuster | 72—352 |
| 3,094,017 | 6/1963 | Champoux | 29—506 |
| 3,057,246 | 10/1962 | Brilmyer | 85—37 |
| 3,034,611 | 5/1962 | Zenzic | 189—36 |
| 3,369,440 | 2/1968 | King | 85—37 |

CHARLES W. LANHAM, Primary Examiner

G. P. CROSBY, Assistant Examiner

U.S. Cl. X.R.

72—391; 29—510